United States Patent [19]

Ototake et al.

[11] Patent Number: 4,730,927
[45] Date of Patent: Mar. 15, 1988

[54] METHOD AND APPARATUS FOR MEASURING POSITIONS ON THE SURFACE OF A FLAT OBJECT

[75] Inventors: Taro Ototake, Kanagawa; Tatsumi Ishizeki, Saitama, both of Japan

[73] Assignee: Nippon Kogaku K.K., Tokyo, Japan

[21] Appl. No.: 849,754

[22] Filed: Apr. 9, 1986

[30] Foreign Application Priority Data

Apr. 9, 1985 [JP] Japan .................................. 60-73549

[51] Int. Cl.⁴ ............................................. G01B 11/30
[52] U.S. Cl. ..................................... 356/371; 356/375
[58] Field of Search ........................ 356/371, 375, 401

[56] References Cited

U.S. PATENT DOCUMENTS 3,847,485 11/1974 Zanoni ................................. 356/375
4,398,824 8/1983 Feldman et al. ..................... 356/401

FOREIGN PATENT DOCUMENTS 0092805 6/1983 Japan .................................. 356/375
0021051 2/1985 Japan .................................. 356/375

Primary Examiner—F. L. Evans
Attorney, Agent, or Firm—M. N. Meller

[57] ABSTRACT

A method and apparatus for the precision measurement of positions, dimensions, etc., of a pattern or mark formed on the surface of a flat object such as a photographic mask or reticle. The amount of vertical deviation of the object with respect to a reference plane is detected at each of a plurality of measuring points and the incline of the surface of the object with respect to the reference plane at each of the measuring points is determined in accordance with the amounts of deviation and the distance between the measuring points. The coordinate positions of each of the measuring points in the reference plane are measured in accordance with the amount of movement of the object parallel to the reference plane and the coordinate positions are corrected in accordance with the corresponding incline.

7 Claims, 6 Drawing Figures

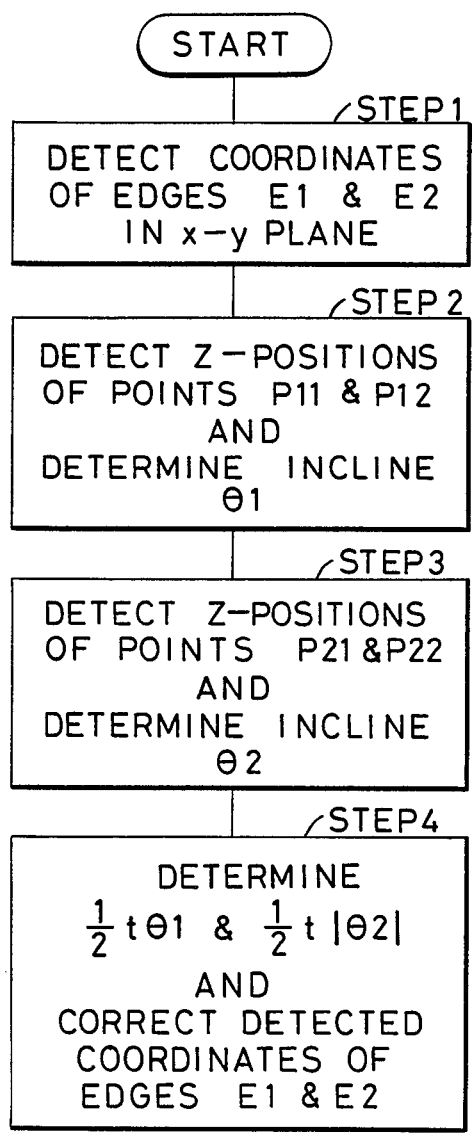

METHOD AND APPARATUS FOR MEASURING POSITIONS ON THE SURFACE OF A FLAT OBJECT

BACKGROUND OF THE INVENTION

1. Field of the Invention

The present invention relates to the precision measurement of the positions, dimensions, etc., of a pattern or mark formed on the surface of a flat object, e.g., a photographic mask or reticle and more particularly to the measurement of the accurate coordinate positions of such pattern or mark which have been corrected for measurement errors due to a deflection of the flat object.

2. Description of the Prior Art

In the measurement of the coordinate positions of a microscopic pattern or mark formed on the surface of a flat object such as a photographic mask or reticle, any planewise distortion in the surface of the object has a considerable effect on the measuring accuracy. Where the measurement is effected by horizontally mounting the object on a holder having a plurality of supports arranged in correspondence to the sides of the object and vacuum chucking the object onto the supports, even if the supports are each provided on a horizontal plane having a good flatness and moreover all the supports are provided on the same horizontal plane, the central portion of the object is deflected downward by the effect of the gravity on the ground that the sides of the object are supported. Noting the vertical section of the object supported in this manner, the deflection thereat is caused in the like manner as the model of a simple beam supported at its ends. In this case, while no planewise run-out is caused at the neutral plane between the upper and lower surfaces of the object irrespective of the deflection according to the Bernoulli-Euler supposition in the strength of materials, the upper surface of the object or the surface containing the pattern or mark is reduced in the plane direction due to the occurrence of the deflection. Therefore, the above-mentioned construction of the holder involves an error in the result of measurement and it is thus not desirable.

Thus, a method has been used in the past in which the holder is processed to produce a plane surface on its whole supporting surface so that the whole area of the lower surface of the object is uniformly contacted with the supporting surface and air is sucked through slots or holes partically formed in the supporting surface thereby chucking the object onto the supporting surface. However, it is extremely difficult to finish the supporting surface to have a sufficient flatness and also it is difficult to force the object to follow the plane shape of the supporting surface by vacuum chucking. Thus, even with this method, the central portion of the object tends to project slightly with respect to the adjoining portion.

Another disadvantage is that if dust or the like deposits on the supporting surface, the lower surface of the object is forced upward at the position of the dust and the flatness is deteriorated.

SUMMARY OF THE INVENTION

It is the primary object of the present invention to provide a method and apparatus capable of measuring the coordinate positions on the surface of a flat object mounted on a holder as effectively as the measurement on an ideal plane surface.

Thus, in accordance with the invention, there are provided a holder (stage) mounting thereon the object to place its surface along a reference plane and movable parallel to the reference plane and means for measuring the amounts of vertical deviation of measuring points on the surface of the object with respect to the reference plane whereby the amounts of vertical deviation of a plurality of points on the surface of the object and the distances between the plurality of points are detected and the inclines of the surface of the object from the reference plane are determined. Then, the coordinate positions of the measuring points in the reference plane measured from the amounts of movement of the stage are corrected in accordance with the determined inclines.

The above and other objects as well as advantageous features of the invention will become more clear from the following description taken in conjunction with the drawings.

BRIEF DESCRIPTION OF THE DRAWINGS

FIG. 6 is a flow chart showing the operation of the embodiment of FIG. 1.

DESCRIPTION OF THE PREFERRED EMBODIMENTS

Figure 1:
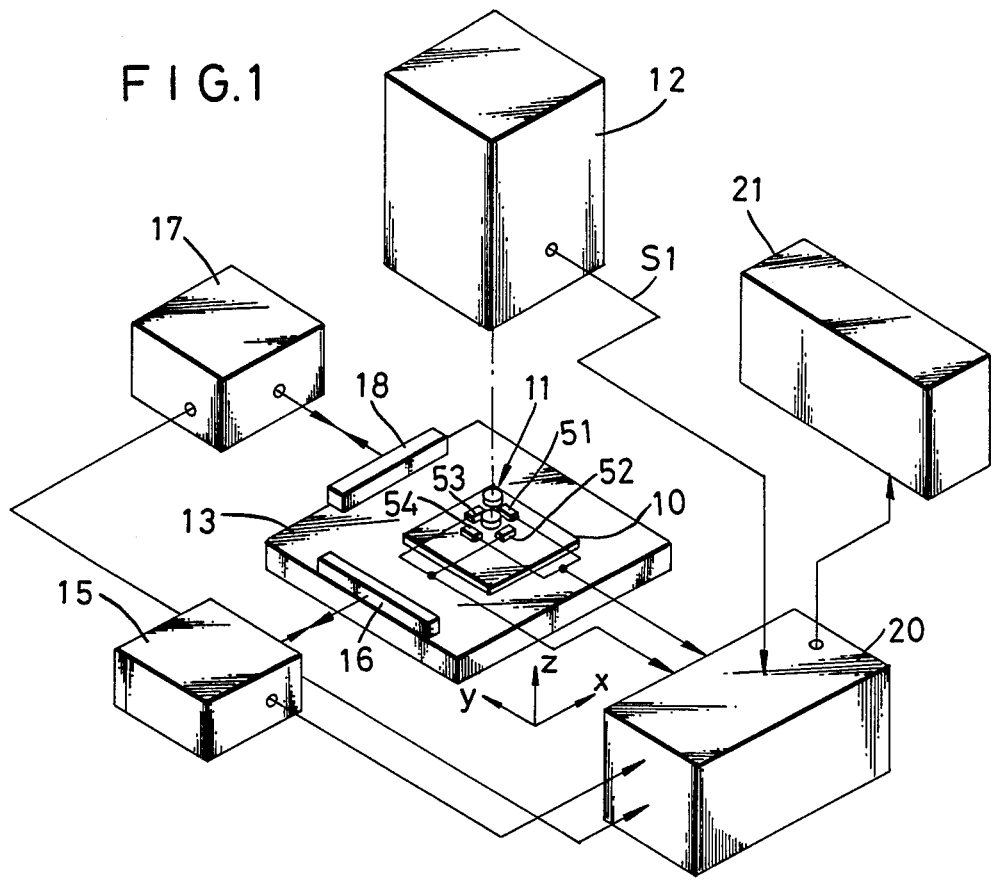
FIG. 1 is a perspective view showing schematically the construction of an apparatus according to an embodiment of the invention.

FIG. 1 illustrates schematically the construction of an embodiment of a measuring apparatus according to the invention. The pattern formed on the surface of a flat substrate such as a photographic mask or reticle is projected in enlarged form at a given position within an optical system 12 through an objective lens 11. A laser light source is arranged within the optical system 12 so as to project a laser spot onto a substrate 10 through the objective lens 11. Generally, the pattern on the mask or reticle is in the form of microscopic ridges or furrows and a relative scanning of the pattern by the laser spot results in the scattered or diffracted light from the edges of the ridges or furrows. Disposed around the objective lens 11 are four photodetectors 51, 52, 53 and 54 which function as edge detecting means for receiving the scattered light or the like. This edge detecting method is disclosed in detail in U.S. Pat. No. 4,112,309 and will not be described.

The optical system 12 also includes a system for detecting the focusing of the objective lens 11 so that the objective lens 11 is automatically focused on the pattern by servo controlling the position of the objective lens 11 in a Z direction. This type of infocus detecting system is disclosed for example in Japanese Utility Model Publication No. 57-44325 and will be described briefly.

Figure 2:
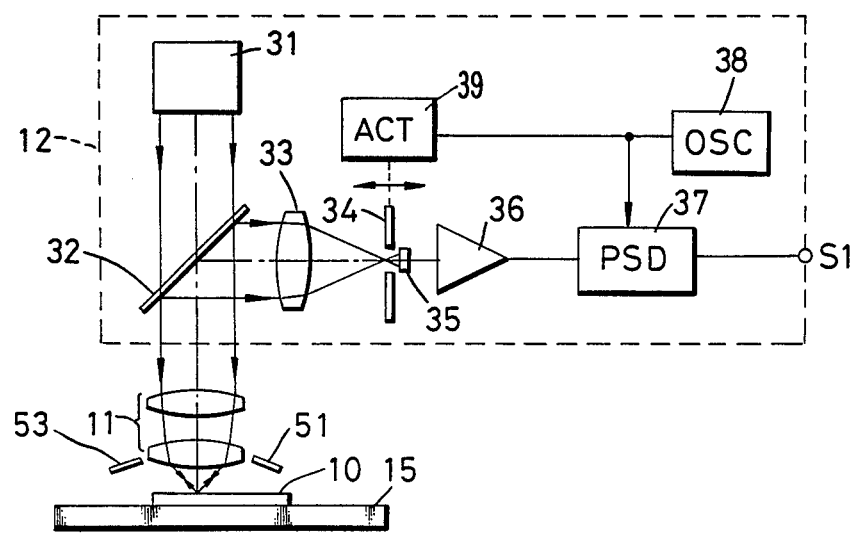
FIG. 2 is a schematic diagram showing the construction of the infocus detecting system shown in FIG. 1.
Figure 3:
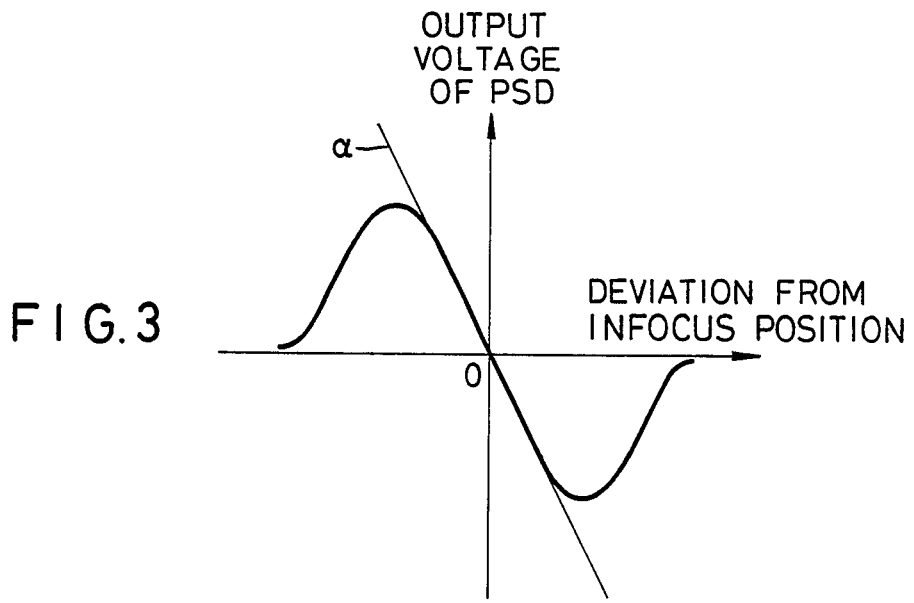
FIG. 3 is a waveform diagram of an S-curve signal.

As shown in FIG. 2, the laser beam from a laser light source 31 is focussed in the form of a spot (or a slit) on the substrate 10 through the objective lens 11. The reflecting light from the substrate 10 is passed through the objective lens 11, reflected by a beam splitter 32 and refocussed through a condenser lens 33. Arranged at this refocal plane is a mask 34 which is formed with a pinhole (or a slit) and the mask plate 34 is caused by an actuator 39 to make a simple harmonic motion in the direction of the optical axis on both sides of a given focal plane. The light transmitted through the pinhole (or slit) is converted to an electric signal by a detector 35. The electric signal is applied to a synchronous detection circuit (PSD) 37 through a preamplifier 36. The harmonic motion of the mask plate 34 is caused in response to the reference signal from an oscillator 38. The reference signal is also applied to the PSD 37. Thus, when the output of the preamplifier 36 is subjected to synchronous detection (synchronous rectification) at the frequency of the simple harmonic motion by the PSD 37, an S-curve (voltage) signal S1 is generated as shown in FIG. 3.

The S-curve signal S1 is such that the variation of the PSD output voltage in response to the amount of deviation from the infocus position 0 shows a linearity in each of the small regions on the sides of the infocus position 0 and it also has a characteristic such that the voltage value becomes zero at the infocus position 0. Thus, the z-direction height of the substrate 10 with respect to the infocus position 0, that is, the distance between the ideal horizontal plane of movement of an XY stage 13 which is two-dimensionally movable with the substrate 10 mounted thereon and the pattern-containing surface of the substrate 10 can be easily detected in accordance with the S-curve signal S1. Then, on the waveform of the S-curve signal S1, the incline α at the infocus position 0 represents the sensitivity α (μm/V) of the defocus and the synchronous detection output. The sensitivity α has been corrected so that it is not dependent on the variation in the reflection intensity of the substrate.

The XY stage 13 having the substrate 10 mounted thereon is two-dimensionally movable in an x-y plane (horizontal plane) by motors which are not shown. The XY stage 13 has been manufactured with a high precision such that any error of the x-y plane (horizontal plane) of movement of the stage 13 with respect to the ideal horizontal plane is sufficiently small as compared with any deflection of the substrate 10.

Interferometer systems 15 and 17 respectively project measuring laser beams to the reflecting surfaces of reflecting mirrors 16 and 18 which are fixedly mounted at the ends of the upper surface of the XY stage 13 and the position of the XY stage 13 or its positions (coordinate values) in the x-y plane on the substrate 10 thereby detecting positions signals indicative of the detected positions. It is to be noted that the position of each pattern edge is detected in terms of the coordinates x and y determined with a given position within the movable range of the XY stage 13 as the origin.

A main control unit 20 for controlling the apparatus of FIG. 1 on the whole comprises a microcomputer and it serves the following preliminarily programmed four functions.

The first function is a distance detecting function of moving the XY stage 13 and then detecting the distances between the plane of movement of the XY stage 13 and the pattern surface of the substrate 10 (or the z-direction positions) at or near the detection positions of a plurality of the pattern edges on the substrate 10 in accordance with the S-curve signal detected by the infocus detecting system incorporated in the optical system 12 and the signals detected by the photodetectors 51, 52, 53 and 54.

The second function is a distance computing function of determining the distances between the plurality of pattern edges in accordance with the position of the pattern edges in the x-y plane detected by the interferometer systems 15 and 17 in response to the determination of the z-direction positions of the pattern surface by the distance detecting function.

The third function is an incline computing function of determining the inclines of the pattern surface defined by the plurality of edges in accordance with the distances (the vertical positions) detected by the distance detecting function and the distance determined by the distance computing function.

The fourth function is a correction function responsive to the inclines determined by the incline computing function to correct the positions of the pattern determined by the pattern edge positions detected by the interferometer systems 15 and 17 by the amount corresponding to the inclines.

The results of the measurements by the main control unit 20 having the above-mentioned functions, the measurement errors due to the deflection of the substrate 10, the corrected positions of the pattern, etc., are indicated on a display 21.

Figure 4:
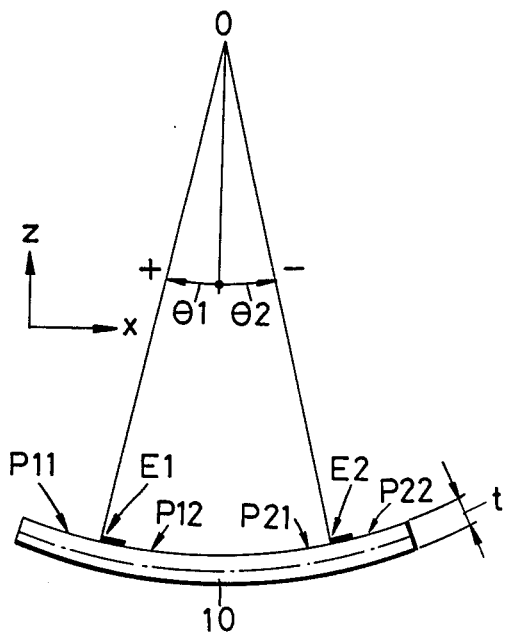
FIG. 4 is a diagram showing an example of a deflection in the substrate.

The operation of the embodiment will now be described with reference to the flow chart of FIG. 6. The operation will be described by way of example with reference to a case where the substrate 10 is arcuately deflected in the x-direction about a point 0 as shown in FIG. 4.

At a first step 1, the positions (coordinate values) of pattern edges E1 and E2 on the substrate 10 in the x-y plane (horizontal plane) are detected in accordance with the positions detected by the interferometer systems 15 and 17 in response to the detection of the pattern edges by the photo-detectors 51, 52, 53 and 54.

Figure 5:
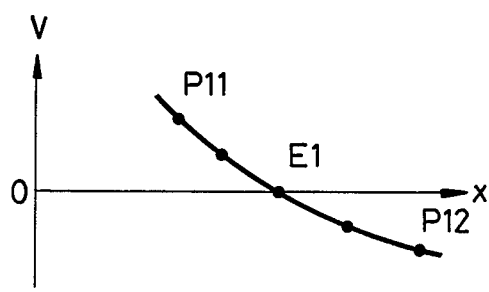
FIG. 5 is a waveform diagram of a voltage signal.

Then, at a step 2, the main control unit 20 determines an x-direction incline $\theta 1$ of the substrate 10 at the edge E by the use of the movement of the XY stage 13, the infocus detecting system of the optical system 12 and the interferometer systems 15 and 17 in accordance with the following procedure. More specifically, the focusing operation of the objective lens 11 is performed in the vicinity of the edge E1 and the infocus detecting system is adjusted in such a manner that the resulting voltage output becomes zero. Then, the XY stage 13 is moved so that the respective points from an adjacent point P11 up to the opposite point P12 through the edge E1 are successively positioned opposite to the objective lens 11 and the resulting voltage outputs at the respective points and near the edge E1 are stored in correspondence to the x-coordinate positions detected by the interferometer systems 15 and 17. In accordance with the thus generated voltage outputs, a voltage output waveform corresponding to the region between the points P11 and P12 is obtained as shown in FIG. 5. Then, the main control unit 20 multiplies the voltage values at the points P11 and P12 by the sensitivity α of the S-curve signal therby determining the z-direction heights or the distances between the plane of movement of the stage 13 and the pattern surface at the points P11 and P12 and also the distance between the points P11 and P12 is determined according to their positions detected by the interferometer systems 15 and 17. Then, in accordance with the thus determined distances, the incline $\theta 1$ of the substrate 10 at the position of the pattern edge E1 is determined by the main control unit 20.

At a step 3, in the like manner as the step 2, the incline of the section between points P21 and P22 is determined and an incline $\theta 2$ at the edge E2 is determined.

Then, at a step 4, correction amounts $\frac{1}{2}t\theta 1$ and $\frac{1}{2}t|\theta 2|$ (where t is the thickness of the substrate 10) at the edges E1 and E2, respectively, are determined thereby correcting the coordinate values of the positions of the edges E1 and E2 detected by the interferometer systems 15 and 17.

It is to be noted that the distance between the edges E1 and E2 includes an error of $\frac{1}{2}t(\theta 1-\theta 2)$ as compared with the case of the substrate 10 in the ideal plane condition. It is assumed that the inclines $\theta 1$ and $\theta 2$ are positive when the substrate 10 is slanted left and are negative when the substrate 10 is slanted right. In this case, the measured distance between the edges E1 and E2 decreases if the incline difference $\theta 1-\theta 2$ is positive and the measured distance increases if the difference $\theta 1-\theta 2$ is negative Also, the inclines $\theta 1$ and $\theta 2$ are cancelled, since the error can be determined from the difference between the inclines $\theta 1$ and $\theta 2$ even if the substrate 10 is inclined from the horizontal plane.

It is to be noted that while the x-direction coordinate values are measured by moving the substrate 10 in the x direction and determining the x-direction inclines of the substrate 10 as mentioned previously, the measurement of y-direction coordinate values can be effected by moving the substrate 10 in the y direction and determining its y-direction inclines.

Further, while, in this embodiment, the inclines are determined in accordance with the S-curve signal detected by the infocus detecting system, the invention is not limited thereto. For instance, by arranging to read the amounts of vertical movement of the objective lens 11 by the use of means such as encoders, interferometers or potentiometers, it is possible to determine an incline $\theta=\Delta Z/\Delta x$ at the edge E1 in accordance with amounts of vertical movement $\Delta Z$ of the objective lens 1 and an amount of movement $\Delta x$ of the XY stage between the points P11 and P12 detected when focusing the objective lens 11 at the points P11 and P12. In this case, the amount of movement $\Delta x$ of the XY stage must be decreased by a certain amount so as to reduce the error in measurment. Further, instead of measuring the vertical movements of the objective lens 11, a Z stage which is vertically movable in the z direction may be arranged on the XY stage so that the amounts of vertical movement of the Z stage are read.

Further, it is possible to use another incline detecting method in which an autocollimator is formed within the optical system 12 by utilizing the objective lens thereby detecting the inclines at measuring points. Also, the edge detecting means may of course be comprised of photoelectric microscopes of the type which uses a vibrating slit or the like so as to scan an image of a pattern edge formed by the objective lens.

We claim:

1. A method of measuring positions of a plurality of measuring points on a surface of a flat object mounted, along a reference plane, on a stage movable parallel to said reference plane, said method comprising the steps of:

(a) moving said stage and measuring coordinate positions of each of said measuring points and of a plurality of adjacent points thereof in said reference plane;

(b) detecting an amount of vertical deviation of each of said plurality of adjacent points from said reference plane;

(c) determining an incline of the surface of said object between each said plurality of adjacent points in accordance with said coordinate positions and amounts of vertical deviation of each of said plurality of adjacent points; and (d) correcting said coordinate positions of said measuring points in accordance with said inclines.

2. A method according to claim 1, wherein a predetermined pattern is formed on the surface of said object, and wherein each of said measuring points is located on one of the edges of said pattern.

3. A method of measuring a distance between first and second measuring points on a surface of a flat object mounted, along a reference plane, on a stage movable parallel to said reference plane, said method comprising the steps of:

(a) moving said stage to detect coordinate positions of each of said first and second measuring points in said reference plane and thereby determine a distance between said first and second measuring points;

(b) moving said stage to detect coordinate positions in said reference plane and an amount of deviation from said reference position of each of a plurality of points adjacent to said first measuring point and thereby determine an incline $\theta 1$ of the surface of said object from said reference plane in the vicinity of said first measuring point;

(c) moving said stage to detect coordinate positions in said reference plane and an amount of vertical deviation from said reference plane of each of a plurality of positions adjacent to said second measuring point and thereby determine an incline $\theta 2$ of the surface of said object from said reference plane in the vicinity of said second measuring point; and (d) correcting the distance between said first and second measuring points in accordance with said inclines $\theta 1$ and $\theta 2$.

4. A method according to claim 3, wherein t represents the thickness of said object whereby the coordinate positions of said first and second measuring points are corrected in accordance with $\frac{1}{2}t\,\theta 1$ and $\frac{1}{2}t\,\theta 2$, respectively, and a distance between said first and second measuring point is determined in accordance with said corrected coordinate positions.

5. An apparatus for measuring a position of a measuring point on a surface of a flat object comprising:

(a) supporting means adapted to mount thereon said object along a reference plane and movable parallel to said reference plane;

(b) means for detecting a position of said supporting means to detect coordinate positions of each of said measuring point and a plurality of points adjacent to said measuring point in accordance with a position of said supporting means;

(c) means including an optical system having an optical axis perpendicular to said reference plane for detecting an amount of deviation of each of said adjacent points from said reference plane when each of said adjacent points is at a position of intersection with said optical axis;

(d) means for determining an incline $\theta 1$ of a surface of said object with respect to said reference surface in the vicinity of said measuring point in accordance with said coordinate positions and amounts of deviation of said plurality of adjacent points; and (e) means for correcting the coordinate positions of said measuring point in accordance with said determined incline $\theta 1$.

6. An apparatus according to claim 5, wherein said deviation detecting means comprises objective lens means and means for detecting an amount of deviation of an image plane of an image of the surface of said object formed by said objective lens means from a predetermined focal plane.

7. An apparatus according to claim 5, wherein a predetermined pattern is formed on the surface of said object, wherein said measuring point is located on one of the edges of said pattern, and wherein said coordinate position detecting means comprises means for projecting a light beam onto said measuring point and means for detecting said light beam scattered at said measuring point.

* * * * *